United States Patent [19]

Sommargren

[11] Patent Number: 4,859,066
[45] Date of Patent: Aug. 22, 1989

[54] LINEAR AND ANGULAR DISPLACEMENT MEASURING INTERFEROMETER

[75] Inventor: Gary E. Sommargren, Santa Cruz, Calif.

[73] Assignee: Zygo Corporation, Middlefield, Conn.

[21] Appl. No.: 216,844

[22] Filed: Jul. 8, 1988

[51] Int. Cl.[4] .............................................. G01B 9/02
[52] U.S. Cl. .................................. 356/349; 356/351; 356/358; 356/363
[58] Field of Search ................. 356/349, 351, 358, 363

[56] References Cited

U.S. PATENT DOCUMENTS 4,717,250 1/1988 Sommargren ................. 356/363 X
4,746,216 5/1988 Sommargren ................. 356/363 X
4,787,747 11/1988 Sommargren et al. ......... 356/363 X Primary Examiner—Davis L. Willis
Assistant Examiner—Matthew W. Koren
Attorney, Agent, or Firm—Bryan, Cave, McPheeters & McRoberts

[57] ABSTRACT

A single interferometer system (20) which simultaneously measures linear and angular displacement of a movable plane mirror (90) employs a frequency stabilized laser (10) which emits an input beam (12) comprised of two linear orthogonally polarized components which may or may not be of the same optical frequency. The input beam (12) is incident on a beamsplitter (14) which transmits a beam (16) and reflects a beam (15), with the reflected beam (15) being reflected off a mirror (18) to form a beam (17) which is parallel to but spatially offset from beam (16). Beams (16) and (17) are incident on interferometer (20) and are used to measure linear and angular displacement, respectively, using a polarization beamsplitter (80), prism (82), retroreflector (81) and quarter phase retardation plate (88). A phase meter/accumulator (99) extracts any phase change and provides an output (100) which is directly proportional to the linear displacement of the movable mirror (40) for beam (167) and another phase meter/accumulator (109) extracts any phase change and provides output (101) which is directly proportional to the angular displacement of the movable mirror (90). The movable mirror (90) is affixed to the stage whose relative position and angle is being measured.

74 Claims, 1 Drawing Sheet

LINEAR AND ANGULAR DISPLACEMENT MEASURING INTERFEROMETER

CROSS-REFERENCE TO RELATED APPLICATIONS

This application is related to the contemporaneously filed, commonly owned copending patent applications of Carl A. Zanoni and me, respectively, both entitled "Linear and Angular Displacement Measuring Interferometer," the contents of which are specifically incorporated by reference herein in their entirety.

BACKGROUND OF THE INVENTION

1. Field of the Invention

The present invention relates to apparatus for the simultaneous measurement of both the linear and angular displacements of a plane mirror. More particularly, the invention relates to optical apparatus which is useful for high accuracy linear and angular displacement metrology using interferometry.

2. The Prior Art

High accuracy linear and angular displacement measurements are required in the machine tool industry and in the semi-conductor industry. Linear displacement is commonly measured with an interferometer. Angular displacement is commonly measured with either an interferometer or an autocollimator.

There are numerous interferometer configurations which can be used to measure the linear displacement of a plane mirror. The plane mirror interferometer and the differential plane mirror are the two most common, see for example S. J. Bennett, "A Doubled-Passed Michelson Interferometer," Opt. Comm. 4, pp. 428-430, 1972, R. R. Baldwin and G. J. Siddall, "A Double-Pass Attachment for the Linear and Plane Interferometer," Proc. SPIE, Vol. 480, pp. 78-83 (May 1984), and G. E. Sommargren, U.S. Pat. No. 4,693,605, issued Sept. 15, 1987.

Sommargren, U.S. Pat. No. 4,717,250, issued Jan. 5, 1988, describes an angular displacement measuring interferometer.

It is possible to measure simultaneously the linear and angular displacements of a plane mirror by using either (1) two linear displacement interferometers offset from each other, or (2) a linear displacement interferometer and an angular displacement interferometer or an autocollimator.

However, using two devices, one to measure linear displacement and the second to measure either linear displacement or angular displacement, has the following disadvantages: (1) complexity because two devices must be installed and aligned, and (2) considerable space is needed thereby requiring that the size of the mirror being measured be increased, especially if it moves in a direction in the plane of the mirror.

The present invention retains the preferred characteristics of both the linear displacement interferometer and the angular displacement interferometer while avoiding the serious limitations of using two of these devices. In the present invention, linear and angular displacements of a plane mirror are measured in a single, compact dual interferometer. The improvements of the present invention thusly overcome the disadvantages of the prior art and allow the high accuracy, simultaneous measurement of both linear and angular displacements of a plane mirror, i.e., to a small fraction of a micrometer and of an arc second, respectively, required for precision high speed X-Y stages.

SUMMARY OF THE INVENTION

In accordance with the instant invention, I provide an interferometer system capable of measuring accurately linear displacement and angular displacement simultaneously of a plane mirror comprising: (1) a source of a frequency stabilized input beam with two linear orthogonally polarized components which may or may not be of the same frequency; (2) means to divide said input beam into two parallel, spatially displaced beams; (3) means, most preferably an optical system comprised of a polarization beamsplitter, a prism, a retroreflector, and a quarter-wave phase retardation plate, to reflect one polarization component of the first of said two parallel beams twice from a movable plane mirror to produce a first output beam and to reflect the other polarization component of the first of said two parallel beams twice from a stationary plane mirror to produce a second output beam; (4) means, said polarization beamsplitter, for recombining said first and second output beams into a third output beam having two orthogonally polarized components in which the phase difference between the two components of the third output beam is related to the linear displacement of said movable plane mirror; (5) means, most preferably a first polarizer, for mixing said orthogonal components of said third output beam; (6) means, most preferably a first photoelectric detector, to produce a first electrical measurement signal; (7) means, most preferably a first phase meter/accumulator, for indicating the first measured phase, the first measured phase being related to the linear displacement of said movable plane mirror; (8) means, most preferably said optical system, to reflect one polarization component of the second of said two parallel beams twice from a first position on said movable plane mirror to produce a fourth output beam and to reflect the other polarization component of the second of said two parallel beams twice from a second position on said movable plane mirror to produce a fifth output beam, said two positions are spatially separated from each other; (9) means, said polarization beamsplitter, for recombining said fourth and fifth output beams into a sixth output beam; (10) means, most preferably a second polarizer, for mixing said orthogonal components of said sixth output beam having two orthogonally polarized components in which the phase difference between the two components of the sixth output beam is related to the angular displacement of said movable plane mirror; (11) means, most preferably a second photoelectric detector, to produce a second electrical measurement signal; and (12) means, most preferably a second phase meter/accumulator, for indicating the second measured phase, the second measured phase being related to the angular displacement of said movable plane mirror.

THE DRAWINGS

In the drawings,

FIG. 1 depicts in schematic form one embodiment of the instant invention to simultaneously measure linear displacement and angular displacement.

DETAILED DESCRIPTION OF THE INVENTION

Figure 1:
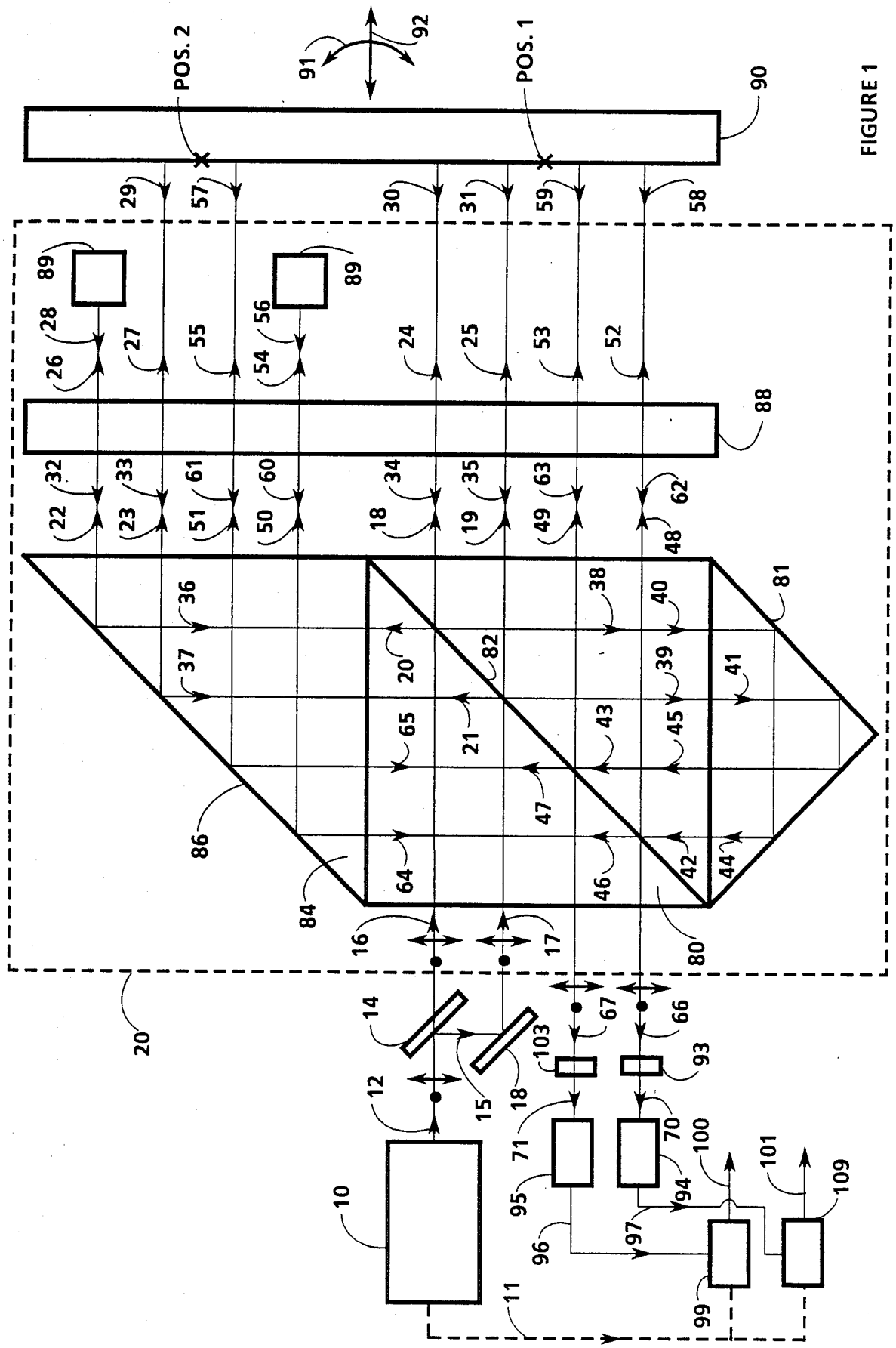

FIG. 1 depicts in schematic form one embodiment of the instant invention. While the apparatus has application for a wide range of radiation sources, the following description is taken by way of example with respect to an optical measuring system. Light source (10), which most preferably uses a frequency stabilized laser, emits input beam (12) which is comprised of two linear orthogonal polarized components as indicated by the dot and arrow, which may or may not be of the same optical frequency. If the frequencies are the same, see for example, Downs, et al., U.S. Pat. No. 4,360,271, issued Nov. 23, 1982. If the frequencies are different, see for example, Bagley, et al., U.S. Pat. No. 3,458,259, issued July 26, 1969 and commonly owned U.S. Pat. No. 4,688,940 issued Aug. 25, 1987, in which source (10) would provide an electrical reference signal (11), shown by the dotted lines, which would correspond to the frequency difference between the two stabilized frequencies. No such reference signal (11) is provided when the two orthogonally polarized components comprising input beam (12) are of the same frequency.

Beam (12) is incident on beamsplitter (14) which transmits fifty percent of the intensity as beam (16) and reflects fifty percent of the intensity to form beam (15). Beam (15) reflects off mirror (18) to form beam (17) which is parallel to but spatially offset from beam (16). There are a variety of means for producing a pair of parallel offset beams from a single beam. Beamsplitter (14) can be either a plate type or a cube type comprised of two right angle prisms. Mirror (18) can be either a front surface plate type or the hypotenuse of a right angle prism using either an internal or external reflection from the hypotenuse. Also, a parallel plate with suitable areas of beamsplitter and reflective optical coatings can be used to produce beams (16) and (17).

Beams (16) and (17) are incident on linear and angular displacement interferometer (20). Beams (16) and (17) are used to measure linear displacement and angular displacement, respectively.

Beam (16) is used to measure linear displacement of movable plane mirror (90) as follows: Beam (16) enters polarization beamsplitter (80) and is incident on polarization coating (82). The polarized beam component in the plane of the figure, denoted by the arrow, is transmitted by coating (82) as beam (18) while the polarized beam component perpendicular to the plane of the figure, denoted by the dot, is reflected by polarization coating (82) as beam (20). Beam (20) is reflected by surface (86) of prism (84) as beam (22). Beams (18) and (22) pass through quarter-wave phase retardation plate (88) and are converted into circularly polarized beams (24) and (26), respectively. Beam (26) is reflected from the upper part of stationary plane mirror (89) as beam (28) while beam (24) is reflected from movable plane mirror (90), affixed to the stage (not shown) whose relative position and angle is being measured, as beam (30). Stationary mirror (89) has either a hole, a cutout, or a transmitting region to allow beams to pass through it. Beams (28) and (30) pass back through quarter-wave phase retardation plate (88) and are converted back into linearly polarized beams (32) and (34), respectively, which are orthogonally polarized to beams (22) and (18), respectively. Beam (32) is reflected from surface (86) as beam (36). Beams (34) and (36) are incident on polarization coating (82) of polarization beamsplitter (80). Because their polarizations have been rotated 90 degrees, beam (36) is transmitted as beam (38) and beam (34) is reflected as beam (40). Beams (38) and (40) are reflected by retroreflector (81) as beams (42) and (44), respectively. Beams (42) and (44) travel parallel to beams (38) and (40), respectively, by means of the properties of retroreflector (81). Beams (42) and (44) are incident on polarization coating (82) of polarization beamsplitter (80). Beam (42) is transmitted as beam (46) and beam (44) is reflected as beam (48). Beam (46) is reflected by surface (86) as beam (50). Beams (48) and (50) pass through quarter-wave phase retardation plate (88) and are converted into circularly polarized beams (52) and (54), respectively. Beam (54) is reflected from the lower part of stationary reference mirror (89) as beam (56) while beam (52) is reflected from movable mirror (90) as beam (58). Beams (56) and (58) pass back through quarter-wave phase retardation plate (88) and are converted back into linearly polarized beams (60) and (62), respectively, which now have the same polarization as beams (22) and (18), respectively. Beam (60) is reflected from surface (86) as beam (64). Beams (62) and (64) are incident on polarization coating (82) of polarization beamsplitter (80). Beam (62) is transmitted and beam (64) is reflected so that they are recombined by polarization beamsplitter (80) to form beam (66). Beam (66), like beam (12), has two orthogonal polarization components. The relative phase between these two polarization components depends on the optical path length traversed by each polarization component. Translation of movable plane mirror (90), as indicated by arrow (92), causes the relative phase to change. This phase change is directly proportional to twice the linear displacement of movable plane mirror (90) at position 1 and is measured by passing beam (66) through polarizer (93), oriented at 45 degrees to each polarization component, which mixes the two polarization components in beam (66) to give beam (70). The interference between the two polarization components is detected by photodetector (94) producing electrical signal (96). Phase meter/accumulator (99) extracts the phase change from electrical signal (96). When the two polarization components of beam (12) are of the same optical frequency, reference signal (11) is not required and phase meter/accumulator (99) extracts the phase change from signal (96) as described in aforementioned U.S. Pat. No. 4,360,271. However, when the two polarization components of beam (12) are of different frequencies, additional sinusoidal electrical reference (11) equal in frequency to the difference between the two optical frequencies is required and phase meter/accumulator (99) extracts the phase change from signal (96) as described in aforementioned U.S. Pat. No. 4,688,940. In either event, phase meter/accumulator (99) provides output (100) which is directly proportional to the linear displacement of movable mirror (90).

Beam (17) is used to measure angular displacement of movable plane mirror (90) as follows: Beam (17) enters polarization beamsplitter (80) and is incident on polarization coating (82). The polarized beam component in the plane of the figure, denoted by the arrow, is transmitted by coating (82) as beam (19) while the polarized beam component perpendicular to the plane of the figure, denoted by the dot, is reflected by coating (82) as beam (21). Beam (21) is reflected by surface (86) of prism (84) as beam (23). Beams (19) and (23) pass through quarter-wave phase retardation plate (88) and are converted into circularly polarized beams (25) and (27), respectively. Beams (25) and (27) are reflected by movable plane mirror (90), affixed to the stage whose relative position and angle are being measured, as beams (31) and (29). Beams (29) and (31) pass back through quarter-wave phase retardation plate (88) and are converted back into linearly polarized beams (33) and (35), respectively, which are orthogonally polarized to beams (23) and (19), respectively. Beam (33) is reflected from surface (86) as beam (37). Beams (35) and (37) are incident on polarization coating (82) of polarization beamsplitter (80). Because their polarizations have been rotated 90 degrees, beam (37) is transmitted as beam (39) and beam (35) is reflected as beam (41). Beams (39) and (41) are reflected by retroreflector (81) as beams (43) and (45) respectively. Beams (43) and (45) travel parallel to beams (39) and (41), respectively, by means of the properties of retroreflector (81). Beams (43) and (45) are incident on polarization coating (82) of polarization beamsplitter (80). Beam (43) is transmitted as beam (47) and beam (45) is reflected as beam (49). Beam (47) is reflected by surface (86) as beam (51). Beams (49) and (51) pass through quarter-wave phase retardation plate (88) and are converted into circularly polarized beams (53) and (55), respectively. Beams (53) and (55) are reflected from movable plane mirror (90) as beams (59) and (57), respectively. Beams (57) and (59) pass back through quarter-wave phase retardation plate (88) and are converted back into linearly polarized beams (61) and (63), respectively, which now have the same polarization as beams (23) and (19), respectively. Beam (61) is reflected from surface (86) as beam (65). Beams (63) and (65) are incident on polarization coating (82) of polarization beamsplitter (80). Beam (63) is transmitted and beam (65) is reflected so that they are recombined by polarization beamsplitter (80) to form beam (67). Beam (67) has two orthogonal polarization components. The relative phase between these two polarization components depends on the path length traversed by each polarization component. Rotation of movable plane mirror (90), as indicated by arrow (91), causes the relative phase to change. This phase change is directly proportional to the angular displacement of movable plane mirror (90) and is measured by passing beam (67) through polarizer (93), oriented at 45 degrees to each polarization component, which mixes the two polarization components in beam (67) to give beam (71). The interference between the two polarization components is detected by photodetector (95) producing electrical signal (97). Phase meter/accumulator (109) extracts the phase change from electrical signal (97). When the two polarization components of beam (12) are of the same optical frequency, reference signal (11) is not required and phase meter/accumulator (109) extracts the phase change from signal (97) as described in aforementioned U.S. Pat. No. 4,360,271. However, when the two polarization components of beam (12) are of different frequencies, additional sinusoidal electrical reference (11) equal in frequency to the difference between the two optical frequencies is required and phase meter/accumulator (109) extracts the phase change from signal (97) as described in aforementioned U.S. Pat. No. 4,688,940. In either event, phase meter/accumulator (109) provides output (101) which is directly proportional to the angular displacement of movable plane mirror (90).

Instead of one quarter-wave phase retardation plate (88), two separate quarter-wave phase retardation plates can be used. Also, if two separate quarter-wave phase retardation plates are used, then one quarter-wave phase retardation plate and the stationary mirror (89) can be located between the polarization beamsplitter (80) and prism (84) without departing from the scope of the invention.

The principal advantages of the instant invention are: (1) a single device provides the simultaneous measurement of both linear and angular displacement, and (2) it is compact.

Although the invention has been described with respect to a light source which emits two stabilized, orthogonally polarized beams of different frequencies, it can also be used when the frequencies are equal without departing from the spirit and scope of the present invention.

While a preferred embodiment of the invention has been disclosed, obviously modification can be made therein, without departing from the scope of the invention as defined in the following claims.

What is claimed is:

1. An interferometer system capable of simultaneously measuring linear displacement and angular displacement of a movable plane mirror comprising a source of a frequency stabilized input beam with two linear orthogonally polarized components; means disposed for dividing said input beam into two parallel, spatially displaced beams each having a pair of orthogonally polarized components; means disposed for reflecting one of said two polarization components of the first of said two parallel beams twice from said movable plane mirror to produce a first output beam and for reflecting the other of said polarization components of the first of said two parallel beams twice from a stationary plane mirror to produce a second output beam; means disposed for recombining said first and second output beams into a third output beam having two orthogonally polarized components in which a phase difference between said two orthogonally polarized components of said third output beam is related to the linear displacement of said movable plane mirror; means for mixing said orthogonal components of said third output beam; means for producing a first electrical measurement signal; means associated with said first electrical measurement signal for indicating a first measured phase, said first measured phase being related to the linear displacement of said movable plane mirror; means for reflecting one polarization component of the second of said two parallel beams twice from a first position on said movable plane mirror to produce a fourth output beam and for reflecting the other polarization component of said second of said two parallel beams twice from a second position on said movable plane mirror to produce a fifth output beam, said two positions being spatially separated from each other; means for recombining said fourth and fifth output beams into a sixth output beam having a pair of orthogonally polarized components; means for mixing said orthogonal components of said sixth output beam having two orthogonally polarized components in which a phase difference between said two components of said sixth output beam is related to the angular displacement of said movable plane mirror; means for producing a second electrical measurement signal; and means associated with said second electrical measurement signal for indicating a second measured phase, said second measured phase being related to the angular displacement of said movable plane mirror; whereby said linear and angular displacement of said movable plane mirror may be simultaneously accurately measured in a single interferometer system.

2. An interferometer system in accordance with claim 1 wherein said frequency stabilized input beam source comprises a laser.

3. An interferometer system in accordance with claim 2 wherein said input beam components are of the same optical frequency.

4. An interferometer system in accordance with claim 2 wherein said input beam components are of different optical frequencies.

5. An interferometer system in accordance with claim 1 wherein said input beam components are of the same optical frequency.

6. An interferometer system in accordance with claim 1 wherein said input beam components are of different optical frequencies.

7. An interferometer system in accordance with claim 4 wherein said input source further comprises means for providing an electrical reference signal to said means for indicating said first and second measured phases, said reference signal corresponding to the frequency difference between said two different optical frequencies.

8. An interferometer system in accordance with claim 6 wherein said input source further comprises means for providing an electrical reference signal to said means for indicating said first and second measured phases, said reference signal corresponding to the frequency difference between said two different optical frequencies.

9. An interferometer system in accordance with claim 1 wherein said means for dividing said input beam into said two parallel spatially displaced beams comprises a beamsplitter.

10. An interferometer system in accordance with claim 9 wherein said input beam dividing means further comprises a mirror optically aligned with said beamsplitter means.

11. An interferometer system in accordance with claim 10 wherein said beamsplitter comprises a plate type beamsplitter.

12. An interferometer system in accordance with claim 10 wherein said beamsplitter comprises a cube type beamsplitter comprising two right angle prisms.

13. An interferometer system in accordance with claim 1 wherein said divided beams of said input beam are utilized for measuring said linear and angular displacements of said movable mirror, respectively.

14. An interferometer system in accordance with claim 9 wherein said divided beams of said input beam are utilized for measuring said linear and angular displacements of said movable mirror, respectively.

15. An interferometer system in accordance with claim 2 wherein said divided beams of said input beam are utilized for measuring said linear and angular displacements of said movable mirror, respectively.

16. An interferometer system in accordance with claim 2 wherein said means for dividing said input beam into said two parallel spatially displaced beams comprises a beamsplitter.

17. An interferometer system in accordance with claim 16 wherein said input beam dividing means further comprises a mirror optically aligned with said beamsplitter means.

18. An interferometer system in accordance with claim 10 wherein said mirror comprises a front surface plate type mirror.

19. An interferometer system in accordance with claim 10 wherein said mirror comprises a hypotenuse of a right angle prism.

20. An interferometer system in accordance with claim 18 wherein said beamsplitter comprises a plate type beamsplitter.

21. An interferometer system in accordance with claim 18 wherein said beamsplitter comprises a cube type beamsplitter comprising two right angle prisms.

22. An interferometer system in accordance with claim 19 wherein said beamsplitter comprises a plate type beamsplitter.

23. An interferometer system in accordance with claim 19 wherein said beamsplitter comprises a cube type beamsplitter comprising two right angle prisms.

24. An interferometer system in accordance with claim 13 wherein said input beam components are of the same optical frequency.

25. An interferometer system in accordance with claim 13 wherein said input beam components are of different optical frequencies.

26. An interferometer system in accordance with claim 1 wherein said means disposed for reflecting one of said two polarization components to produce said first and second output beams comprises an optical system comprising a polarization beamsplitter.

27. An interferometer system in accordance with claim 26 wherein said optical system further comprises a prism.

28. An interferometer system in accordance with claim 27 wherein said optical system further comprises a retroreflector.

29. An interferometer system in accordance with claim 28 wherein said optical system further comprises a quarter-wave phase retardation plate.

30. An interferometer system in accordance with claim 2 wherein said means disposed for reflecting one of said two polarization components to produce said first and second output beams comprises an optical system comprising a polarization beamsplitter.

31. An interferometer system in accordance with claim 30 wherein said divided beams of said input beam are utilized for measuring said linear and angular displacements of said movable mirror, respectively.

32. An interferometer system in accordance with claim 26 wherein said divided beams of said input beam are utilized for measuring said linear and angular displacements of said movable mirror, respectively.

33. An interferometer system in accordance with claim 26 wherein said means for recombining said first and second output beams into said third output beam comprises said polarization beamsplitter.

34. An interferometer system in accordance with claim 30 wherein said means for recombining said first and second output beams into said third output beam comprises said polarization beamsplitter.

35. An interferometer system in accordance with claim 33 wherein said divided beams of said input beam are utilized for measuring said linear and angular displacements of said movable mirror, respectively.

36. An interferometer system in accordance with claim 34 wherein said divided beams of said input beam are utilized for measuring said linear and angular displacements of said movable mirror, respectively.

37. An interferometer system in accordance with claim 1 wherein said means for mixing said orthogonal components of said third output beam comprises a first polarizer.

38. An interferometer system in accordance with claim 2 wherein said means for mixing said orthogonal components of said third output beam comprises a first polarizer.

39. An interferometer system in accordance with claim 37 wherein said divided beams of said input beam are utilized for measuring said linear and angular displacements of said movable mirror, respectively.

40. An interferometer system in accordance with claim 38 wherein said divided beams of said input beam are utilized for measuring said linear and angular displacements of said movable mirror, respectively.

41. An interferometer system in accordance with claim 1 wherein said means for producing said first electrical measurement signal comprises a first photoelectric detector.

42. An interferometer system in accordance with claim 2 wherein said means for producing said first electrical measurement signal comprises a first photoelectric detector.

43. An interferometer system in accordance with claim 41 wherein said divided beams of said input beam are utilized for measuring said linear and angular displacements of said movable mirror, respectively.

44. An interferometer system in accordance with claim 42 wherein said divided beams of said input beam are utilized for measuring said linear and angular displacements of said movable mirror, respectively.

45. An interferometer system in accordance with claim 42 wherein said means for indicating said first measured phase comprises a first phase meter/accumulator.

46. An interferometer system in accordance with claim 2 wherein said means for indicating said first measured phase comprises a first phase meter/accumulator.

47. An interferometer system in accordance with claim 45 wherein said divided beams of said input beam are utilized for measuring said linear and angular displacements of said movable mirror, respectively.

48. An interferometer system in accordance with claim 46 wherein said divided beams of said input beam are utilized for measuring said linear and angular displacements of said movable mirror, respectively.

49. An interferometer system in accordance with claim 26 wherein said means for producing said fourth and fifth output beams comprises said optical system.

50. An interferometer system in accordance with claim 2 wherein said means for producing said fourth and fifth output beams comprises said optical system.

51. An interferometer system in accordance with claim 49 wherein said divided beams of said input beam are utilized for measuring said linear and angular displacements of said movable mirror, respectively.

52. An interferometer system in accordance with claim 50 wherein said means for producing said fourth and fifth output beams comprises said optical system.

53. An interferometer system in accordance with claim 49 wherein said means for recombining said fourth and fifth output beams into a sixth output beam comprises said polarization beamsplitter.

54. An interferometer system in accordance with claim 50 wherein said means for recombining said fourth and fifth output beams into a sixth output beam comprises said polarization beamsplitter.

55. An interferometer system in accordance with claim 53 wherein said divided beams of said input beam are utilized for measuring said linear and angular displacements of said movable mirror, respectively.

56. An interferometer system in accordance with claim 54 wherein said divided beams of said input beam are utilized for measuring said linear and angular displacements of said movable mirror, respectively.

57. An interferometer system in accordance with claim 26 wherein said means for recombining said fourth and fifth output beams into a sixth output beam comprises said polarization beamsplitter.

58. An interferometer system in accordance with claim 2 wherein said means for recombining said fourth and fifth output beams into a sixth output beam comprises said polarization beamsplitter.

59. An interferometer system in accordance with claim 57 wherein said divided beams of said input beam are utilized for measuring said linear and angular displacements of said movable mirror, respectively.

60. An interferometer system in accordance with claim 58 wherein said divided beams of said input beam are utilized for measuring said linear and angular displacements of said movable mirror, respectively.

61. An interferometer system in accordance with claim 1 wherein said means for mixing said orthogonal components of said sixth output beam comprises a second polarizer.

62. An interferometer system in accordance with claim 2 wherein said means for mixing said orthogonal components of said sixth output beam comprises a second polarizer.

63. An interferometer system in accordance with claim 61 wherein said divided beams of said input beam are utilized for measuring said linear and angular displacements of said movable mirror, respectively.

64. An interferometer system in accordance with claim 62 wherein said divided beams of said input beam are utilized for measuring said linear and angular displacements of said movable mirror, respectively.

65. An interferometer system in accordance with claim 37 wherein said means for mixing said orthogonal components of said sixth output beam comprises a second polarizer.

66. An interferometer system in accordance with claim 38 wherein said means for mixing said orthogonal components of said sixth output beam comprises a second polarizer.

67. An interferometer system in accordance with claim 1 wherein said means for producing said second electrical measurement signal comprises a second photodetector.

68. An interferometer system in accordance with claim 2 wherein said means for producing said second electrical measurement signal comprises a second photodetector.

69. An interferometer system in accordance with claim 67 wherein said divided beams of said input beam are utilized for measuring said linear and angular displacements of said movable mirror, respectively.

70. An interferometer system in accordance with claim 68 wherein said divided beams of said input beam are utilized for measuring said linear and angular displacements of said movable mirror, respectively.

71. An interferometer system in accordance with claim 1 wherein said means for indicating a second measured phase comprises a second phase meter/accumulator.

72. An interferometer system in accordance with claim 2 wherein said means for indicating a second measured phase comprises a second phase meter/accumulator.

73. An interferometer system in accordance with claim 71 wherein said divided beams of said input beam are utilized for measuring said linear and angular displacements of said movable mirror, respectively.

74. An interferometer system in accordance with claim 72 wherein said divided beams of said input beam are utilized for measuring said linear and angular displacements of said movable mirror, respectively.

* * * * *